E. D. TOOPS.
VEHICLE SPRING SUPPORT.
APPLICATION FILED JAN. 31, 1910.
974,313.
Patented Nov. 1, 1910.
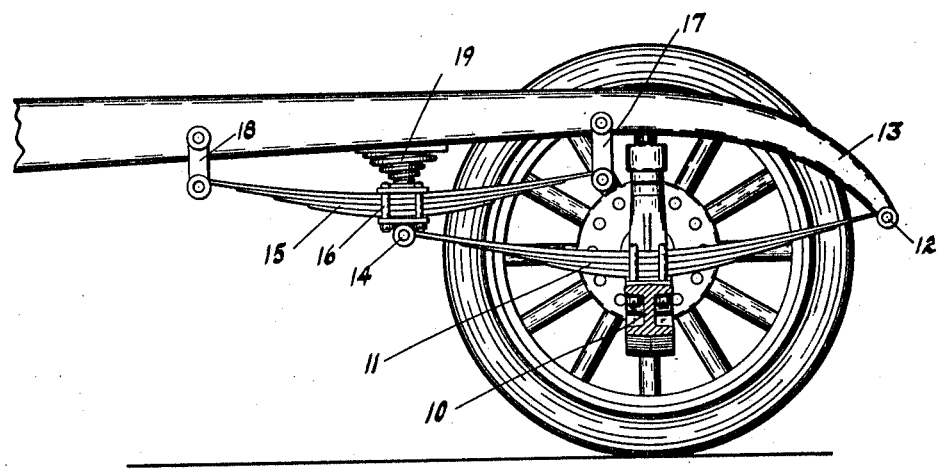
Witnesses
Walter Troomel.
Thomas W. McMeans
Inventor
Emory D. Toops.
by Bradford Hood
Attorneys.

UNITED STATES PATENT OFFICE.

EMORY D. TOOPS, OF INDIANAPOLIS, INDIANA, ASSIGNOR OF ONE-HALF TO CHARLES B. CLARKE, OF INDIANAPOLIS, INDIANA.

VEHICLE-SPRING SUPPORT.

974,313.  Specification of Letters Patent.  Patented Nov. 1, 1910.

Application filed January 31, 1910. Serial No. 541,003.

*To all whom it may concern:*

Be it known that I, EMORY D. TOOPS, a citizen of the United States, residing at Indianapolis, in the county of Marion and State of Indiana, have invented certain new and useful Improvements in Vehicle-Spring Supports, of which the following is a specification.

The object of my invention is to produce a spring mounting between the frame and supporting wheels of vehicles, the structure being more especially designed for a connection between the front wheels and the frame of an automobile, although by no means limited to such use.

The accompanying drawing, which is a fragmentary side elevation, shows my invention as applied between the front wheel and the main frame of an automobile.

In the drawings, 10 indicates the axle, which will carry at each end a spring 11 which is conveniently of the leaf type. The forward end of spring 11 is pivotally connected at 12 to the frame 13 and at its rear end spring 11 is connected, preferably pivotally, at 14 to a spring which is interposed between the point 14 and the frame 13. In the form illustrated in the drawings this interposed spring is a leaf spring 15 which is provided at its middle with a clamp 16 carrying the connection 14. The ends of spring 15 are so connected to the frame 13 as to allow for the lengthening of the spring under load and in the drawings I have shown this connection as consisting of a pair of depending links 17 and 18 pivotally connected at their lower ends to the ends of spring 15 and pivotally supported at their upper ends on frame 13. It will be readily understood that many other desirable forms of connection between spring 15 and frame 13 might be used without departing from the spirit of my invention. In order to further stiffen spring 15 under shocks, I provide a spiral spring 19 which is interposed between the center of spring 15 and frame 13.

I claim as my invention:

1. In a vehicle, the combination of a supporting axle and the main frame, of a spring secured at its middle to the axle and at one end to the main frame, a second spring connected at its middle to the free end of the first spring and connected at its ends to the main frame.

2. In a vehicle, the combination of a supporting axle and the main frame, of a spring secured at its middle to the axle and at one end to the main frame, a second spring connected at its middle to the free end of the first spring and connected at its ends to the main frame, and a third compression spring interposed between the middle of the second spring and the main frame.

3. The combination of a supporting axle, a longitudinally extended leaf spring secured at its middle to the axle, a main frame connected to one end of said spring, a second longitudinally extended leaf spring connected at its middle to the opposite end of the first spring and connections between the ends of the second spring and the main frame.

4. The combination of a supporting axle, a longitudinally extended leaf spring secured at its middle to the axle, a main frame connected to one end of said spring, a second longitudinally extended leaf spring connected at its middle to the opposite end of the first spring, a compression spring interposed between the middle of the second spring and the main frame, and connections between the ends of the second spring and the main frame.

In witness whereof, I have hereunto set my hand and seal at Indianapolis, Indiana, this 21st day of January, A. D. one thousand nine hundred and ten.

EMORY D. TOOPS [L. S.]

Witnesses:
 ARTHUR M. HOOD,
 THOMAS W. McMEANS.